United States Patent

[11] 3,611,374

| [72] | Inventor | Derrick W. Draysey<br>Malvern, England |
| --- | --- | --- |
| [21] | Appl. No. | 865,435 |
| [22] | Filed | Oct. 10, 1969 |
| [45] | Patented | Oct. 5, 1971 |
| [73] | Assignee | National Research Development Corporation<br>London, England |
| [32] | Priority | Mar. 31, 1967 |
| [33] | | Great Britain |
| [31] | | 14839/67 |
| | | Continuation of application Ser. No. 717,357, Mar. 29, 1968, now abandoned. |

[54] RADAR APPARATUS AND SYSTEMS
14 Claims, 5 Drawing Figs.
[52] U.S. Cl. .................................................. 343/7.7,
343/5 PD, 343/8, 331/107 G, 343/14
[51] Int. Cl. ....................................................... G01s 9/42

[50] Field of Search............................................ 343/5 PD,
7.7, 8; 331/107 G

[56] References Cited
UNITED STATES PATENTS
| 3,383,682 | 5/1968 | Stephens .................... | 343/8 |
| --- | --- | --- | --- |
| 3,512,155 | 5/1970 | Bloice ......................... | 343/8 |

*Primary Examiner*—T. H. Tubbesing
*Attorney*—Cushman, Darby & Cushman

ABSTRACT: A radar apparatus comprised of a transferred electron oscillator in association with a cavity resonant at the frequency of oscillation of the transferred electron oscillator. A mixing diode in the signal path between the transferred electron oscillator and a transmit/receive aerial yields a difference output. The frequency of the radar may be modulated or swept by enclosing the transferred electron oscillator within a ferrite collar whereby changing the applied voltage to the transferred electron oscillator changes the frequency of the radar.

PATENTED OCT 5 1971  3,611,374

William Derrick Draysey
Inventor

By
Cushman, Darby & Cushman
Attorneys

RADAR APPARATUS AND SYSTEMS

This application is a continuation of application Ser. No. 717,357, filed on Mar. 29, 1968, now abandoned.

The present invention relates to radar apparatus and systems. With the coming of the transferred electron oscillator its possibilities as the basis of a miniature radar apparatus have been realized by many people. These possibilities include small size, convenient power supplies and high frequency working. The transferred electron oscillator is known also as the Gunn diode, and a complete description of its theory of operation may be had by reference to the article entitled "Transferred Electron Amplifiers and Oscillators" by C. Hilsum in Volume 50, Proceedings of the IRE, pages 185 to 189, Feb. 19, 1962. A miniature radar apparatus which is truly portable could be put to many uses. However designing a miniature radar apparatus is not so easy a problem as may at first appear for the bulkiest part of the apparatus is likely to be the aerials. Clearly for this reason it would be advantageous to use only one aerial. However such single aerial sets contain a duplexer or other apparatus providing for separate signal paths. This introduces bulk, complication and expense. The result is that typical miniature radars have to make shift with two aerials.

It is an object of this invention to provide a truly compact and portable radar system having a minimum of bulk and weight.

It is another object of the invention to provide a miniature radar having a single aerial and no duplexer or other apparatus providing for separate signal paths.

According to the present invention there is provided a radar apparatus consisting of a transferred electron oscillator, a cavity resonant at the frequency of oscillation of the transferred electron oscillator and placed in operational relationship with the transferred electron oscillator, an aerial, a signal path between the transferred electron oscillator and the aerial, mixing means in the signal path and means for extracting difference signals from the mixing means.

Embodiments of the invention will be described by way of example with reference to the drawings accompanying this specification, in which FIG. 1 is a cross-sectional diagram of part of a radar apparatus;

Figure 1:
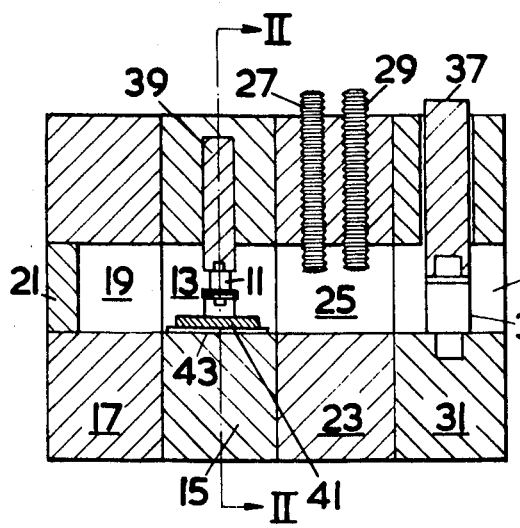

In FIG. 1 a gallium arsenide transferred electron oscillator diode 11 is mounted in a cavity 13 within a block 15. Of course, any of a number of types of such diodes may be used, the choice being dictated by the output parameters desired. A further block 17 containing a cavity 19 closed by a short circuit 21 is mounted behind the block 15. On the side of the block 15 remote from the block 17 is mounted an adjustable matching section 23 containing a cavity 25 and matching screws 27 and 29. A fourth block 31 mounted on the block 23 contains a cavity 33 which has mounted within it a detector element, preferably a mixer diode 35 which has an output connection 37. The blocks 15, 23 and 31 when placed together in an abutting relationship define a unitary signal path through which the transmitted and received signals proceed. Block 17 defines therein a resonant cavity aligned with the signal path.

In operation oscillations from the transferred electron oscillator 13 build up in the cavity between the transferred electron oscillator 11 and the short circuit 21, provided that the distance between the center of the transferred electron oscillator diode 11 and the short circuit 21 is approximately half the guide wavelength $\lambda g$ of oscillation generated by the transferred electron oscillator diode 11. It is to be noted that a transferred electron oscillator which is not in a cavity will have a natural frequency of oscillation which depends on the bias voltage applied to it. In the case, however, where a cavity is closely coupled to the oscillator, as in the case of the preferred embodiment described herein, the oscillator will ordinarily assume a frequency that depends closely upon the cavity and is therefore not voltage dependent. Most of the energy from the transferred electron oscillator diode 11 is radiated by the aerial system (not shown in FIG. 1) on the side of the cavity 33 remote from the matching section 23 but some will be absorbed by the mixer diode 35, which is directly in the path of the radiated energy from diode 11. Returning radiation from a target incident upon the mixer diode 35 is mixed with the portion of outgoing radiation absorbed in the mixer diode 35. Any frequency difference appears in the form of a difference signal at the output 37 of the mixer diode 35. Such a frequency difference would be most likely to be due to a reflecting target whose velocity relative to the radar has a radial component. The matching screws 27 and 29 adjust the characteristics of the cavity 25 for best results i.e. maximum signal to noise ratio from a standard moving target.

Figure 2:
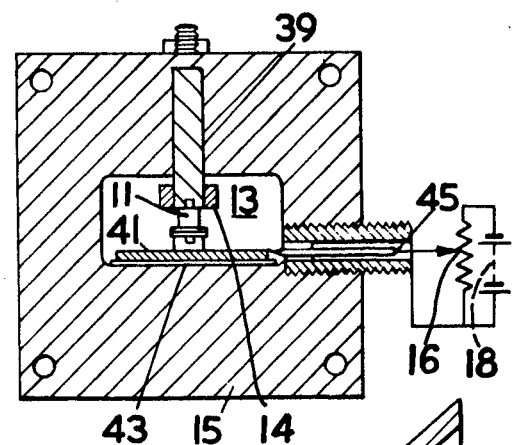
FIG. 2 is another cross-sectional diagram of part of a radar apparatus.

FIG. 2 is a cross section of the radar on the line II—II of FIG. 1. The transferred electron oscillator diode 11 is mounted between a post 39 and a radio frequency bypass conductor 41, insulated from the body of the block 15 by a layer 43 of insulation 50 microns thick. The conductor 41 is connected to the center conductor of a coaxial socket 45 by means of which a direct current supply may be made to the transferred electron oscillator diode 11. FIG. 2 also discloses an alternative embodiment of the transferred electron oscillator which may be used. The element 14 shown surrounding transferred electron oscillator diode 11 is a collar of ferrite material. It is to be noted that this collar of ferrite material is not necessary to the operation of the invention but need only be used as desired. For a cavity operating in J-band a suitable size for such a collar might be three-sixteenths inch long with an outside diameter of one-fourth inch and an inside diameter of one-eighth inch. This collar size will, of course, vary in proportion to the size of cavity used. When ferrite collar 14 is in place, a variation of the voltage applied to the diode 11 via the coaxial socket 45 will result in a change in the frequency of oscillation of the radar. The direct current source used in the illustrative preferred embodiment is a battery 18 with a potentiometer 16 is connected thereacross. The output of potentiometer 16 is connected to the center conductor in coaxial socket 45. Thus, the transferred electron oscillator is tunable by merely adjusting the bias voltage. This is contrary to the operation of the FIG. 1 embodiment in which the frequency of oscillation is substantially controlled by cavity 19. The radar can then be used in swept frequency or frequency modulation modes.

An alternative method of mounting the transferred electron oscillator may of course be used; the method described has been selected merely for the purposes of illustration.

Figure 3:
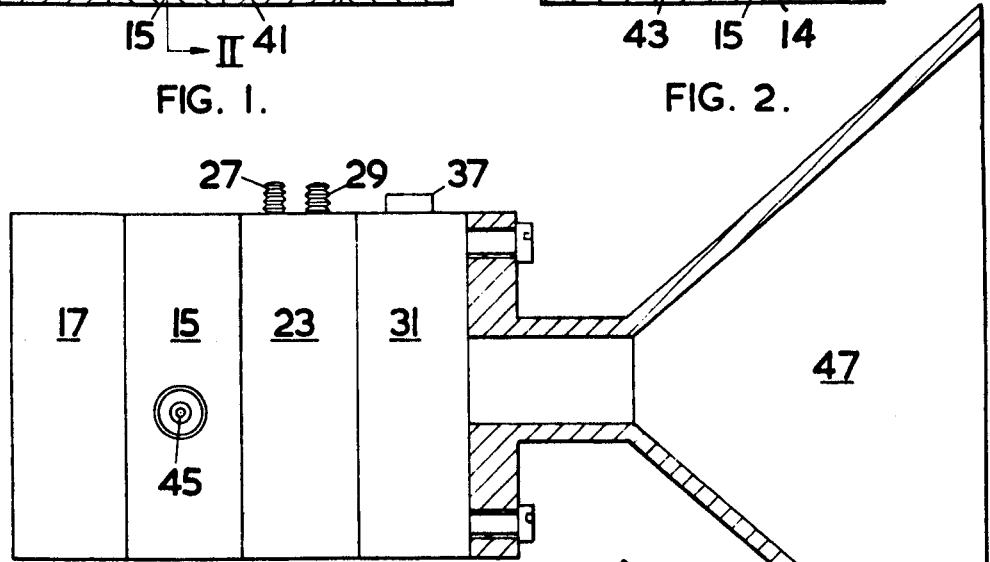
FIG. 3 is a diagram partly in cross section of the radar apparatus.

FIG. 3 is a diagram partly in cross section of the radar apparatus. This illustrates a possible horn aerial 47 bolted on the front of the radar described above with reference to FIG. 1. Those skilled in the art will realize that many alternative types of aerial would be suitable, for example, a dielectric rod, a small dish, a Yagi array or a helical array.

A truly miniature, portable radar is likely to find a good deal of use in the future in many different places, for example as an intruder alarm or a blind aid, or in a vehicle detection or control system or for any velocity measurements. However it must be remembered that the radar apparatus described is a doppler radar and consequently gives radial velocity information rather than range information. In other words it would provide useful for detecting the presence of a moving target (such as an intruder) or the proximity of a step or curb (by sweeping the beam over the step or curb) or the proximity of an approaching (or receding) object rather than to ascertain how far any object is away.

An example of the use of the radar in a vehicle control system will be given.

Figure 4:
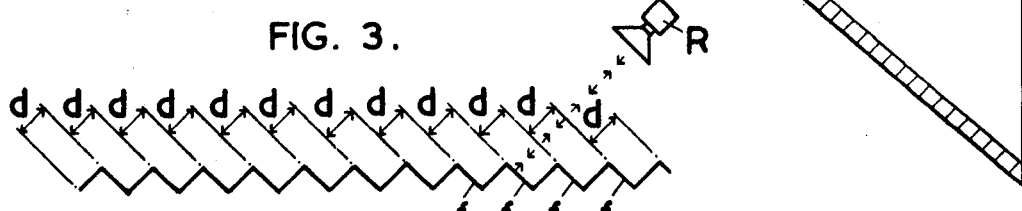
FIG. 4 is a diagram of part of a road to which a reflecting surface has been applied.

FIG. 4 is a diagram of part of a road to which a reflecting surface has been applied. The reflecting surface presents parallel faces $f$ orthogonal to the direction of the beam from the radar R (which is assumed to be fixed in attitude). The important feature is the orthogonal distance $d$ between adjacent faces $f$; this should be a whole number $n$ of half wavelengths, $$d = n\lambda/2$$

Typically $n=1$, and $d=\frac{1}{2}\lambda$.

An alternative reflecting surface would consist of a plurality of parallel wires arranged so hat the beam for the radar R strikes them vertically. The wires would correspond to the peaks of the reflecting surface illustrated in FIG. 4, and so the distance between them will be $\lambda/2\sin\Theta$, where $\Theta$ is the angle of the radar beam from the normal to the plane in which the wires lie. If $\Theta=45°$, the distance will be $\lambda/2\frac{1}{2}$.

Figure 5:
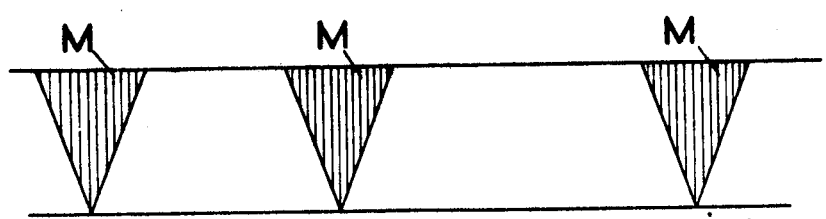
FIG. 5 is a plan view of a road to which a reflecting surface has been applied.

FIG. 5 is a plan view of a road to which reflecting surfaces have been applied. It will be observed that with a doppler radar set such as this, since the doppler frequency output is proportional to the radial component of the velocity of the target relative to the radar set, and since the time of dwell of the beam on a given width of reflecting surface on a road is inversely proportional to the radial component of the velocity of the reflecting surface relative to the radar set, the number of cycles of doppler frequency (of any frequency whatsoever) generated on crossing a given width of reflecting surface on a road is constant no matter what the relative velocity between the radar set and the road. In fact, the number of cycles are proportional to the width in the direction of motion of the reflecting surface. The number of cycles generated in the radar can be extracted as a guide to the position or aspect of a vehicle or even used in a control system to help a vehicle to maintain course. For example, if triangular pieces of reflecting surface are applied to a road as shown in FIG. 5, where the width of a reflecting surface parallel to the road is proportional to the distance across the road a control signal can operate on the steering of the vehicle in order to maintain the position of the vehicle on the road so that it follows a track parallel to the curb.

As explained above, this system does not depend on the velocity of the vehicle, neither does it depend upon the reflecting surfaces being a constant distance apart: they can be more narrowly spaced, for example, where track keeping is particularly important or particularly difficult.

Alternative possible uses of the invention include vibration monitoring - for example, the contactless detection of vibrations in a model in a wind tunnel or the analysis of complex oscillations in equipment experiencing many modes of vibrations of different frequencies. The output from the radar may for these purposes be applied to a frequency analyzer.

A further possible use is a radar tachometer. If a rotating shaft possesses a discontinuity such as a keyway or other groove or if a discontinuity such as a piece of metal can be fastened on it, then the discontinuity will provide a signal as it moves through the radar beam. The rate of output signals from the radar will give a direct measure of speed of rotation in revolutions per minute unless the discontinuity occurs more than once (for example a groove right through a shaft will produce two output pulses per revolution).

What is claimed is:

1. A radar apparatus comprising a transferred electron oscillator,
   means defining a cavity resonant at the frequency of oscillation of said transferred electron oscillator and placed with respect to said oscillator so that said oscillator is electrically coupled to said cavity,
   an aerial for radiating the output of said oscillator and for receiving a return signal,
   a detector element in which is produced a difference signal representative of the frequency difference between said radiated signal and said return signal,
   means for extracting said difference signal from said detector element,
   an unbranched waveguide means defining a signal path between said oscillator and said detector element, said oscillator and said detector element being placed within said waveguide means and in said signal path such that a portion of the energy transmitted from said oscillator impinges upon said detector element and is absorbed therein, said aerial being connected to said waveguide as to form an extension of said signal path.

2. The radar apparatus defined in claim 1 comprising in addition a ferrite collar placed in a surrounding relationship with said transferred electron oscillator and
   variable means for applying a bias voltage to said transferred electron oscillator.

3. The radar apparatus defined in claim 1 wherein said detector element is a mixing diode.

4. The radar apparatus defined in claim 3 wherein said transferred electron oscillator and said mixing diode are placed within said waveguide in a parallel relationship and spaced along the length of said signal path defined in said waveguide.

5. The radar apparatus defined in claim 1 wherein said waveguide means is comprised of a plurality of blocks defining cavities therein, said blocks being placed in an abutting relationship aligning said cavities to form said signal path,
   said aerial being mounted at an end of said wave guide means as to form an extension of said signal path,
   said transferred electron oscillator being mounted within the cavity in a first of said blocks extending thereacross,
   said detector element being mounted within the cavity of a second of said blocks between said transferred electron oscillator and said aerial and extending across said cavity in said second block,
   and said resonant cavity being formed by the cavity in a third of said blocks by a short circuit element placed thereacross, said third block being directly adjacent said first block on a side thereof remote from said aerial.

6. Radar apparatus comprising:
   an unbranched waveguide forming an elongated cavity closed on one end and having secured to the waveguide at the other end of said cavity in signal communication therewith a signal transmit-receive aerial,
   a transferred electron oscillator diode disposed wholly in said cavity adjacent said one end thereof for producing an oscillation signal therein,
   a portion of said cavity at said one end being resonant to said oscillation signal for coupling that signal to the remainder of the cavity which forms from said diode an oscillation signal path to said aerial or transmission thereby to effect a return signal thereto,
   a detecting mixing diode disposed wholly in said cavity and in said oscillation signal path between said oscillator and antenna for receiving and mixing said oscillation signal and return signal to develop a frequency difference signal, and
   means for extracting said difference signal from said mixing diode to the exterior of said wave guide.

7. Apparatus as in claim 6 wherein said waveguide is rectangular throughout at least the length of its said cavity.

8. Apparatus as in claim 6 including means for varying the frequency of said oscillation signal.

9. Apparatus as in claim 8 wherein said frequency-varying means comprises means for applying a variable bias to said oscillator.

10. Apparatus as in claim 9 wherein said frequency-varying means includes a ferrite collar around said oscillator diode.

11. Radar apparatus comprising:
    an unbranched waveguide forming an elongated cavity closed on one end and having secured to the wave guide at the other end of said cavity in signal communication therewith a single transmit-receive aerial,
    an oscillator semiconductor disposed wholly in said cavity adjacent said one end thereof for producing an oscillation signal therein, a portion of said cavity at said one end being resonant to said oscillation signal for coupling that signal to the remainder of the cavity which forms from said semiconductor an oscillation signal path to said aerial for transmission thereby to effect a return signal thereto, a mixing detector semiconductor disposed wholly in said cavity and in said oscillation signal path between said oscillator and antenna for receiving and mixing said oscillation signal and return signal to develop a frequency difference signal, and means for extracting said difference signal from said detector semiconductor to the exterior of said waveguide.

12. Apparatus as in claim 11 wherein said waveguide is rectangular throughout at least the length of said cavity.

13. Radar apparatus comprising:

an unbranched, rectangular waveguide forming an elongated cavity closed on one end and having secured to the waveguide at the other end of said cavity in signal communication therewith a single transmit-receive aerial, an oscillator diode disposed wholly in said cavity adjacent said one end thereof for producing an oscillation signal therein, a portion of said cavity at said one end being resonant to said oscillation signal for coupling that signal to the remainder of the cavity which forms from said diode a single, nonduplexed, unconverting polarization oscillation signal path to said aerial for transmission thereby to effect a return signal thereto, a mixing detector diode disposed wholly in said cavity and in said oscillation signal path between said oscillator and antenna for receiving and mixing said oscillation signal and return signal to develop a frequency difference signal, and means for extracting said difference signal from said detector diode to the exterior of said waveguide.

14. Apparatus as in claim 13 including matching means operative on said cavity between said diodes for adjusting the signal to noise ratio from a standard moving target.